United States Patent [19]

Gnauert et al.

[11] Patent Number: 5,259,650
[45] Date of Patent: Nov. 9, 1993

[54] RELEASABLE FAST-ACTION PIPE COUPLING

[75] Inventors: Werner Gnauert, Iserlohn; Detlef Hochstein, Hemer, both of Fed. Rep. of Germany

[73] Assignee: Friedrich Grohe Aktiengesellschaft, Hemer, Fed. Rep. of Germany

[21] Appl. No.: 891,828

[22] Filed: Jun. 1, 1992

[30] Foreign Application Priority Data

Jun. 14, 1991 [DE] Fed. Rep. of Germany ....... 4119642

[51] Int. Cl.⁵ ............................................. F16L 35/00
[52] U.S. Cl. ..................... 285/39; 285/319; 285/422; 285/921; 285/347
[58] Field of Search ............... 285/39, 34, 35, 319, 285/321, 422, 921, 347; 411/508, 509, 510, 913

[56] References Cited

U.S. PATENT DOCUMENTS

| | | | |
|---|---|---|---|
| 589,813 | 9/1897 | Campbell | 285/35 |
| 1,277,982 | 9/1918 | Matte | 285/39 X |
| 1,854,674 | 4/1932 | Savon | 285/319 X |
| 3,345,084 | 10/1967 | Hanes et al. | 285/321 X |
| 3,389,923 | 6/1968 | Love | |
| 3,773,360 | 11/1973 | Timbers | |
| 4,105,226 | 8/1978 | Frey | |
| 4,576,402 | 3/1986 | Murray et al. | 285/39 |
| 4,582,350 | 4/1986 | Okajima | 285/39 X |
| 4,610,468 | 9/1986 | Wood | 285/319 X |
| 4,616,855 | 10/1986 | Ruhle | 285/39 X |
| 4,930,816 | 6/1990 | Yih | 285/321 |

FOREIGN PATENT DOCUMENTS

| | | |
|---|---|---|
| 2304658 | 8/1973 | Fed. Rep. of Germany . |
| 3933589 | 4/1991 | Fed. Rep. of Germany . |
| 1527018 | 7/1977 | United Kingdom . |
| 2099945 | 6/1982 | United Kingdom . |

*Primary Examiner*—Dave W. Arola
*Attorney, Agent, or Firm*—Herbert Dubno; Andrew Wilford

[57] ABSTRACT

A releasable fast-action coupling has a female part formed centered on an axis with an axially outwardly open bore having a smooth-walled inner portion of predetermined diameter and an outer portion of somewhat greater diameter and formed with an internal screwthread. A male tube part having an end engageable in the bore has an inner portion engageable in the inner bore portion and formed with a radially outwardly open groove, an outer portion engageable in the outer bore portion when the inner tube portion is in the inner bore portion and formed with a radially outwardly open groove, and a radially outwardly projecting ridge axially inwardly engaging the bore shoulder when the tube part is fitted in the bore. An elastic seal ring seated in the groove of the tube inner portion radially outwardly engages the bore inner portion when the tube part is fitted in the bore. A coupling sleeve seated in the groove of the tube outer portion is rotatable on the tube part and formed with a plurality of angularly spaced, radially outwardly, and axially outwardly projecting tabs braced axially outwardly against the screwthread of the bore outer portion when the tube part is fitted in the bore.

11 Claims, 3 Drawing Sheets

RELEASABLE FAST-ACTION PIPE COUPLING

FIELD OF THE INVENTION

The present invention relates to a fast-action pipe coupling. More particularly this invention concerns such a pipe coupling which can be released or undone if necessary.

BACKGROUND OF THE INVENTION

In commonly owned patent application Ser. No. 07/749,164 of J. Humpert (now U.S. Pat. No. 5,213,377) a fitting is described which is formed with an outwardly open generally cylindrical bore centered on an axis and having an inner surface of a predetermined inner diameter. A tube end fits axially into the bore and is formed with a radially outwardly open groove, and a partial stiff sleeve of elastically deformable and strong material is engaged in the groove and has a frustoconically outwardly flared sharp outer edge of a predetermined outer diameter. Interengaging formations on the sleeve and on the tube end spread the sleeve and force the edge to bite into the inner surface of the bore on axial outward displacement of the sleeve and tube end. An elastomeric seal ring on the tube end offset from the groove radially outwardly engages the bore. Such an arrangement constitutes a coupling that is extremely easy to put together, but virtually impossible to take apart.

In another known system described in German patent document 2,304.658 of W. L. Jones (claiming a British priority of Feb. 2, 1972) the tube end is provided with an O-ring and is formed at a short spacing outward of this seal with an outwardly projecting ridge that lies against the mouth of the bore when the tube end is fitted into the bore. A holddown plate formed with a hole that snugly surrounds the tube end is screwed down to the fitting to press the ridge against its outer face, thereby holding the tube end in place. This system is once again fairly complex in that it has several different parts even though it has the advantage of being susceptible of disassembly if required. It is also somewhat bulky so that it cannot readily be adapted to single-hole mounting faucets and the like.

German patent document 3,933,589 of G. Wachter et al describes a stab-type fast-action coupling where elastic tabs on the male part snap into place behind a radially inwardly projecting ridge of the female part to hold the two parts together. Thus assembly is very simple and the device is fairly compact. Nonetheless taking the joint apart is either impossible or requires a complex special-duty tool.

OBJECTS OF THE INVENTION

It is therefore an object of the present invention to provide an improved pipe coupling.

Another object is the provision of such an improved pipe coupling which overcomes the above-given disadvantages, that is which is compact and simple, which can be joined together easily, and that can be uncoupled easily.

SUMMARY OF THE INVENTION

A releasable fast-action coupling has according to the invention a female part formed centered on an axis with an axially outwardly open bore having a smooth-walled inner portion of predetermined diameter and an outer portion of somewhat greater diameter and formed with an internal screwthread. A male tube part having an end engageable in the bore has an inner portion engageable in the inner bore portion and formed with a radially outwardly open groove, an outer portion engageable in the outer bore portion when the inner tube portion is in the inner bore portion and formed with a radially outwardly open groove, and a radially outwardly projecting ridge axially inwardly engaging the bore shoulder when the tube part is fitted in the bore. An elastic seal ring seated in the groove of the tube inner portion radially outwardly engages the bore inner portion when the tube part is fitted in the bore. A coupling sleeve seated in the groove of the tube outer portion is rotatable on the tube part and formed with at least one, and normally with a plurality of angularly spaced, radially outwardly, and axially outwardly projecting tabs braced axially outwardly against the screwthread of the bore outer portion when the tube part is fitted in the bore.

Thus with this arrangement the coupling can be made up by simply stabbing the tube end into the bore. The tab or tabs will ratchet against the screwthread and lock the unit mechanically together, while the O-ring will insure a good seal. The joint can be undone fairly easily simply by unscrewing the sleeve.

According to the invention the tabs extend at an angle of between 30° and 90°, preferably 60°, to the axis. In addition the sleeve is formed with a longitudinally throughgoing slot so that it can be spread to fit it over the tube end. The screwthread is a buttress thread having a right-angle flank that is directed axially inward and an inclined flank that is directed axially outward. The outer ends of the tabs lie on a helix that is of the same pitch as the screwthread so that all the tabs can bear at the same time on the right-angle flank of this screwthread.

In accordance with a further feature of the invention the sleeve is provided with at least one tool-engaging formation, normally a radially throughgoing hole, so that the sleeve can be unscrewed from the bore.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
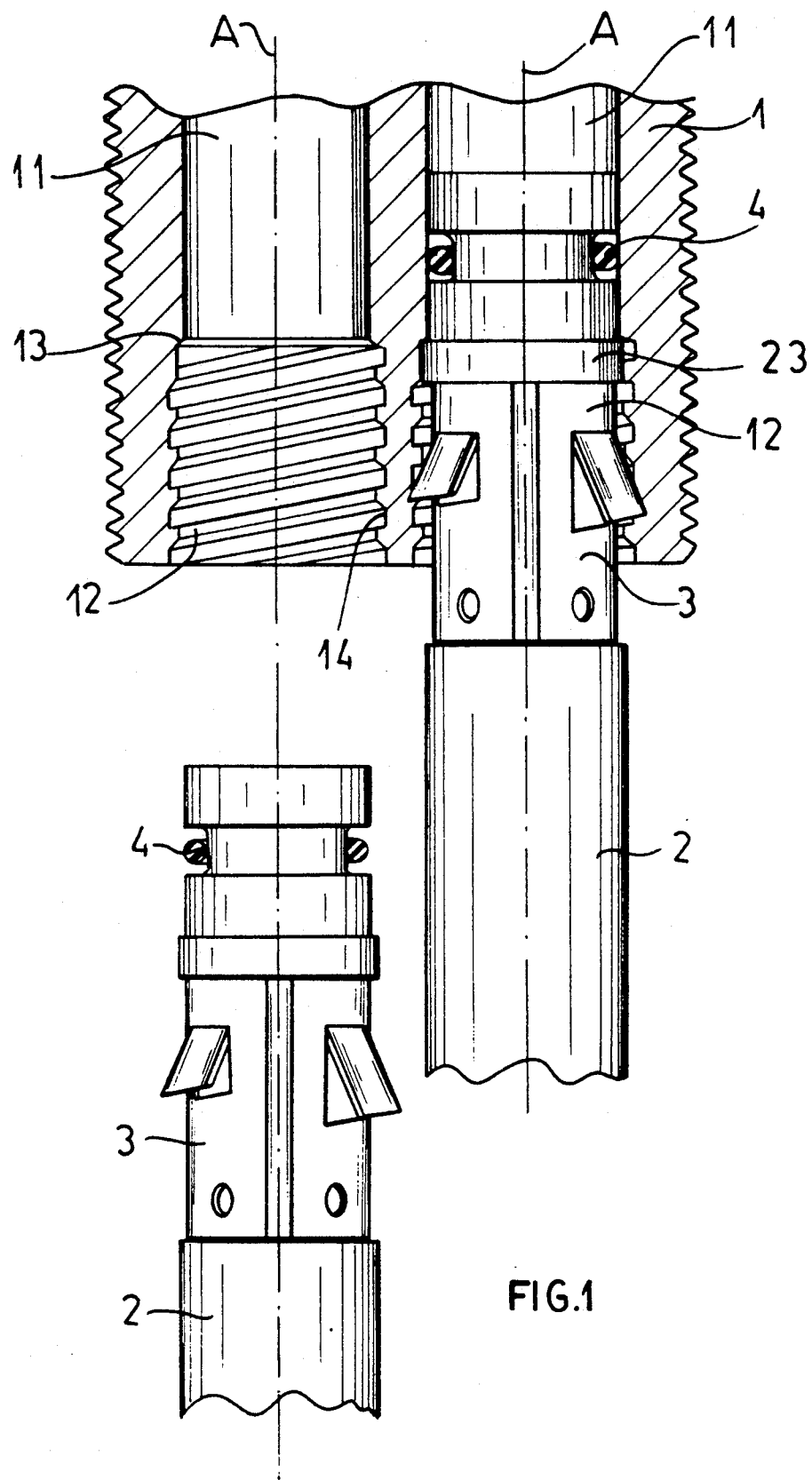
FIG. 1 is an axial section through a fitting having the coupling of this invention.

As seen in FIG. 1 a coupling according to this invention is basically formed of a female part 1, a male tube end 2, and a coupling sleeve 3 and O-ring 4 set in the tube end 2.

The female part 1 is a large-diameter externally threaded stem that is here part of a single-hole faucet assembly. It is formed with two identical normally downwardly open bores 11, 12 each having an inner cylindrical portion 11 centered on an axis A and of a diameter of slightly more than 10 mm and an outer portion 12 formed with a screwthread 14 and of a slightly larger diameter, so that an axially outwardly directed shoulder 13 is formed between the smooth unthreaded bore portion 11 and the threaded portion 12. The screwthread 14 in the portion 12 is a buttress thread of the S 11.2×2 type with its right-angle flank directed axially inward (up in FIG. 1).

Figures 2, 6:
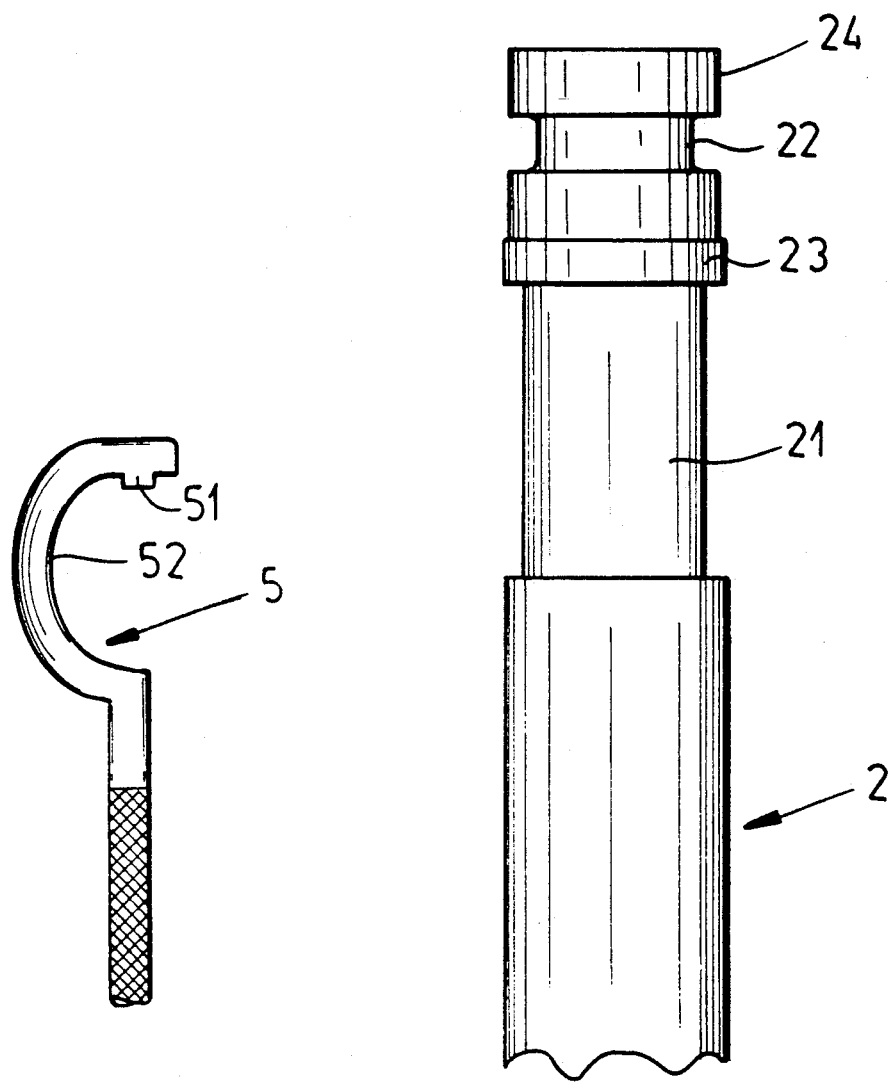
FIG. 2 is a side view of the tube end of the coupling.
FIG. 6 is a side view of a tool for opening the coupling of this invention.

The tube end 2 is formed as shown in FIG. 2 with an inner portion 24 of a diameter of 10 mm so that it fits in the portion 11 and with a radially outwardly projecting ridge 23 that axially inwardly abuts the shoulder 13 when the pipe 2 is fitted in the respective bore 11, 12. The inner portion 24 is formed with a radially outwardly open groove 22 in which the O-ring 4 is seated. Immediately outward of the ridge 23 the tube 2 is formed with a radially outwardly open groove 21 in which the coupling sleeve 3 is received.

Figure 3:
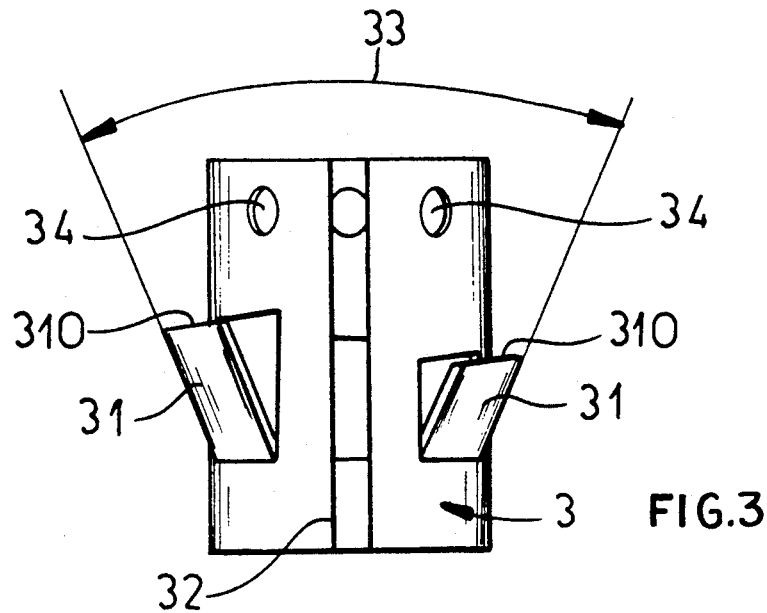
FIG. 3 is a side view of the coupling sleeve.
Figure 4:
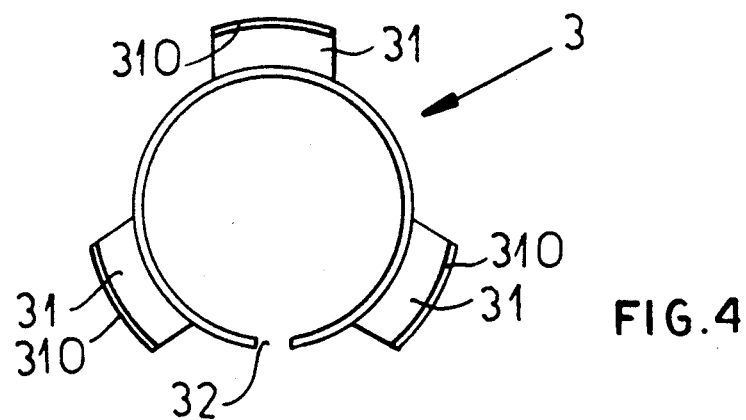
FIG. 4 is a top end view of the coupling sleeve.
Figure 5:
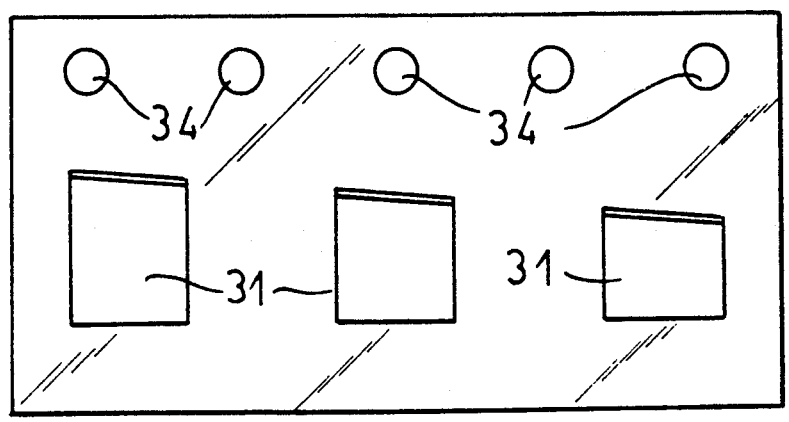
FIG. 5 is a side view of the coupling sleeve shown flattened out.

This sleeve 3 is as shown in FIGS. 3 through 5 made of 0.5 mm thick chromium-steel sheet metal and is shaped into a cylinder with an axially throughgoing gap 32 so that it can be spread to fit it over the tube end 24. The sleeve 3 is here formed with three angularly equispaced punched-out tabs 31 that together form an angle 33 of 60° and that have axially inner ends 310 that are angled and axially offset from each other at the same angle as the pitch of the screwthread 14 of the portion 12. In addition the sleeve 3 is formed with a row of circular radially throughgoing bores 34 that are used to install the sleeve 3 on the tube 2 and to decouple the coupling.

In use the O-ring 4 and the sleeve 3 are fitted over the end of the tube 2. The sleeve 3 is first spread, for instance by using the holes 34, and is axially pushed down over the end 24 and ridge 23 until it snaps into place in the groove 21 with its tabs 31 projecting toward the tube end. Then the O-ring 4 is simply slid over the end 24 until it seats elastically in the groove 23.

The tube 2 is then pushed axially into the bore 11, 12 until the ridge 23 abuts the shoulder 13. In this position the O-ring 4 will sealingly engage the smooth wall of the inner portion 11 and the tabs 31 will be braced against the screwthread 14 of the portion 12. The joint is therefore tightly sealed and mechanically strong.

To open the joint a tool 5 shown in FIG. 6 is used. This tool 5 has a tooth 51 and a semicircular seat 52 so the tooth 51 can be engaged in one of the sleeve holes 34 and the seat 52 engaged around the sleeve 3 to allow the sleeve 3 to be rotated in a sense to screw it out of the screwthread 14. Such disassembly in no way damages the parts so the joint can be reassembled later easily and will be just as good as the first time it was used.

We claim:

1. A releasable fast-action coupling comprising:
   a female part formed with an outwardly open bore centered on an axis and having
      a smooth-walled inner portion, and
      an outer portion formed with an internal screwthread;
   a male tube part having an end engaged in the bore and having
      an inner portion engaged in the inner bore portion, and
      an outer portion engaged in the outer bore portion when the inner tube portion is in the inner bore portion;
   an elastic seal ring seated in the tube inner portion and radially outwardly engaging the bore inner portion when the tube part is fitted in the bore; and
   a coupling sleeve axially fixed to the tube outer portion, rotatable on the tube part, and formed with at least one radially elastically deflectable and radially outwardly and axially outwardly projecting tab braced axially outwardly against the screwthread of the bore outer portion and bearing elastically radially outward thereagainst when the tube part is fitted in the bore.

2. The releasable fast-action coupling defined in claim 1 wherein the sleeve is formed with a plurality of such tabs spaced angularly apart and having outer ends lying on a helix of the same pitch as the screwthread of the bore, whereby all the tabs can simultaneously be braced against the screwthread.

3. The releasable fast-action coupling defined in claim 2 wherein the tabs extend at an angle of between 30° and 90° to the axis.

4. The releasable fast-action coupling defined in claim 3 wherein the outer tube portion is formed with a radially outwardly open groove in which the sleeve is seated.

5. The releasable fast-action coupling defined in claim 1 wherein the sleeve is formed with a longitudinally throughgoing slot.

6. The releasable fast-action coupling defined in claim 1 wherein the inner tube end is formed with a radially outwardly open groove in which the seal ring is seated.

7. The releasable fast-action coupling defined in claim 1 wherein the screwthread is a buttress thread having a right-angle flank that is directed axially inward.

8. The releasable fast-action coupling defined in claim 1 wherein the sleeve is formed of stainless steel.

9. The releasable fast action coupling defined in claim 1 wherein the bore outer portion is of substantially greater diameter than the tube inner portion and the bore is formed between the bore portions with an axially outwardly directed shoulder, the tube being formed between the tube portions with a radially outwardly projecting ridge that axially inwardly engages the bore shoulder when the tube is fitted in the bore.

10. The releasable fast-action coupling defined in claim 1 wherein the sleeve is provided with at least one tool-engaging formation, whereby the sleeve can be unscrewed from the bore.

11. A releasable fast-action coupling comprising:
    a female part formed with an outwardly open bore centered on an axis and having
       a smooth-walled inner portion of predetermined diameter,
       an outer portion of somewhat greater diameter and formed with an internal screwthread;
    a male tube part having an end engaged in the bore and having
       an inner portion engaged in the inner bore portion and formed with a radially outwardly open groove,
       an outer portion engaged in the outer bore portion when the inner tube portion is in the inner bore portion and formed with a radially outwardly open groove, and
       a radially outwardly projecting ridge axially inwardly engaging the bore shoulder when the tube part is fitted in the bore;
    an elastic seal ring seated in the groove of the tube inner portion and radially outwardly engaging the bore inner portion when the tube part is fitted in the bore; and
    a sheet-metal coupling sleeve seated in the groove of the tube outer portion, rotatable on the tube part, and unitarily formed with a plurality of angularly spaced, radially elastically deflectable, radially outwardly projecting, and axially outwardly projecting tabs braced axially outwardly against the screwthread of the bore outer portion and bearing elastically radially outwardly thereagainst when the tube part is fitted in the bore.

* * * * *